United States Patent [19]

Mitani et al.

[11] Patent Number: 4,687,801

[45] Date of Patent: Aug. 18, 1987

[54] RESIN COMPOSITION

[75] Inventors: Tetsuo Mitani, Toyonaka; Fumiaki Baba, Kobe; Katsuyoshi Iisaka, Kawanishi, all of Japan

[73] Assignee: Mitsubishi Denki Kabushiki Kaisha, Tokyo, Japan

[21] Appl. No.: 776,885

[22] Filed: Sep. 17, 1985

[30] Foreign Application Priority Data

Sep. 17, 1984 [JP] Japan ................................ 59-196167
Jan. 9, 1985 [JP] Japan ..................................... 60-1898

[51] Int. Cl.$^4$ .......................... C08K 3/10; C08K 5/04; C08K 5/20; C08K 5/41
[52] U.S. Cl. ..................................... 524/104; 524/139; 524/173; 524/205; 524/210; 524/211; 524/233; 524/401; 524/404; 524/418; 524/428; 524/520; 524/910
[58] Field of Search ............... 524/910, 520, 404, 401, 524/418, 379, 428, 104, 139, 173, 210, 211, 233; 504/205

[56] References Cited

U.S. PATENT DOCUMENTS

| | | | |
|---|---|---|---|
| 3,454,540 | 7/1969 | Clovis | 524/910 |
| 4,061,834 | 12/1977 | Hadek et al. | 428/522 |
| 4,112,206 | 9/1978 | Wingrave | 524/910 |
| 4,391,952 | 7/1983 | Lybrand | 524/910 |
| 4,450,249 | 5/1984 | Schmidt et al. | 524/910 |
| 4,559,380 | 12/1985 | Kasuga et al. | 524/910 |

FOREIGN PATENT DOCUMENTS

| | | | |
|---|---|---|---|
| 613594 | 1/1961 | Canada | 524/910 |
| 2207251 | 3/1977 | Fed. Rep. of Germany . | |
| 2043905 | 2/1979 | Fed. Rep. of Germany . | |
| 1466072 | 12/1966 | France . | |
| 7404217 | 10/1974 | Netherlands | 524/910 |

OTHER PUBLICATIONS

M. Miyamura, M. Sakamoto, Y. Nakajima, Polymer Preprints, Japan, 1, (10), 2871 (1982).
M. Watanabe et al., Macromol. Chem., Rapid Commun., 2, 741 (1981).

*Primary Examiner*—Allan M. Lieberman
*Attorney, Agent, or Firm*—Oblon, Fisher, Spivak, McClelland, & Maier

[57] ABSTRACT

A resin composition which consists essentially of a thermoplastic resin, in which are included an alkali metal salt, and at least one kind of substances selected from the group consisting of vinylidene fluoride resin and dipolar aprotic solvents.

6 Claims, No Drawings

RESIN COMPOSITION

BACKGROUND OF THE INVENTION

1. Field of the Invention

This invention relates to a resin composition having an antistatic effect. More particularly, it is concerned with a resin composition which has an antistatic effect as well as being transparent.

2. Description of the Prior Art

In general, plastic materials have high electric resistance, hence they are readily charged by friction and like other actions to inevitably attract onto the surface thereof dust and like other foreign substances to make its outer appearance unsightly or to be the cause for erroneous operations and disorders in electrical and electronic appliances.

For decreasing static charging of the plastic materials which is readily chargeable, there has so far been known to apply an antistatic agent onto the surface of the plastic materials, or kneading such antistatic agent into the plastic materials. As the antistatic agent for application, there has been known various surface active agents or silicon compounds.

However, such antistatic surface active agent is readily removed from the plastic materials by washing, so that maintenance of its antistatic effect over a long period of time is difficult to expect. While the silicon compound can be expected to have a fairly good antistatic effect, control of its conditions for application, nevertheless, is difficult, its working efficiency is also poor, and moreover, it has a disadvantageous aspect in cost for its treatment. On the other hand, kneading of the antistatic agent into the plastic material exhibits its effect by exudation of such antistatic agent to the surface of the plastic material, on account of which its effect remarkably decreases by washing or friction of the plastic materials, the recovery of which requires a long period of time.

Furthermore, since both of the above-mentioned methods are to exhibit their antistatic effect by increasing the ion conductivity on the surface of the resin due to adsorption of moisture in the air onto the surface thereof, the presence of water is indispensable, on account of which various problems remain, such as in the atmosphere where humidity is low and the antistatic effect becomes disadvantageously low.

SUMMARY OF THE INVENTION

The present invention has been made to remove these problems inherent in the conventional plastic materials as previously mentioned and providing an improved resin composition which maintains a favorable antistatic effect even in an atmosphere of low humidity and in which its antistatic effect is not reduced by washing material.

Another object of the present invention is to provide a resin composition which, in addition of the above-mentioned characteristics, has excellent transparency.

According to the present invention there is provided a resin composition which consists essentially of a thermoplastic resin, in which are included an alkali metal salt, and at least one kind of substances selected from the group consisting of vinylidene fluoride resin and dipolar aprotic solvents.

DETAILED DESCRIPTION OF THE INVENTION

The foregoing objects as well as specific ingredients used for the resin composition according to the present invention, will become more apparent from the following detailed description thereof when read in connection with several preferred examples thereof below.

In the resin composition according to the present invention, the alkali metal salt is dissolved in the resin composition to be ionically dissociated, which, when exposed to with an electric field, moves within the resin composition tending to neutralize electric charge, whereby an antistatic effect is produced. Both dipolar aprotic solvent and vinylidene fluoride resin accelerate ionic dissociation of the alkali metal salt in the absence of water. By this accelerating action, the antistatic effect is exhibited to a satisfactory extent. The vinylidene fluoride resin, in comparison with a low molecular weight compound having the same effect, possess the characteristic that it neither lowers the heat-deformation temperature of the resin composition, nor is it oozed out to the surface of the resin composition. Furthermore, with a view to improving the antistatic effect, both vinylidene fluoride resin and dipolar aprotic solvent may be mixed together.

When acrylic resin is used as the thermoplastic resin, transparency of the acrylic resin can be maintained, since the alkali metal salt, the dipolar aprotic solvent, and the vinylidene fluoride resin all have good compatibility with the acrylic resin, and moreover they are dissolved in the resin in the form of molecular dispersion or other form similar to it.

Although it has already been known that a composition obtained by mixing lithium perchlorate and polyethylene glycol with the acrylic resin exhibits electrical conductivity (for details, reference may be had to "Polymer Preprints, Japan", Vol. 31, No. 10, S3M01, Li-"Liceo4-PMMA, Ionic Conductivity of Composite Material"), it is still difficult to render this resin composition as transparent as in the resin composition according to the present invention when an acrylic resin is used as the thermoplastic resin.

There is an appropriate range for the quantity of the alkali metal salt and the dipolar aprotic solvent to be contained in the thermoplastic resin according to the present invention. That is to say, a desirable mixing ratio of the alkali metal salt may be in a range of from 0.1 part by weight to 30 parts by weight with respect to 100 parts by weight of the thermoplastic resin. When the quantity of the alkali metal salt does not reach 0.1 part by weight, the electric conductivity of the resin becomes less improved, hence its antistatic effect is low.

On the other hand, when the quantity of the alkali metal salt exceeds 30 parts by weight, crystals tend to be readily deposited, and the resulting resin composition becomes brittle. The mixing ratio of the dipolar aprotic solvent should preferably be in a range of from 1 part by weight to 30 parts by weight per 100 parts by weight of the thermoplastic. With the quantity of the dipolar aprotic solvent not reaching 1 part by weight, the accelerating effect of the ionic dissociation is very small. On the contrary, when its quantity exceeds 30 parts by weight, the heat-deformation temperature of the resin composition is remarkably lowered with the consequence that the resin composition will become less valuable as the ordinary plastic material for shaping.

There is a desirable range for mixing the vinylidene fluoride resin and the alkali metal salt into the acrylic resin. That is to say, the mixing ratio of the vinylidene fluoride resin may be in a range of from 1 part by weight to 50 parts by weight with respect to 100 parts by weight of the acrylic resin. When the vinylidene fluoride resin is less than 1 part by weight, improvement in the electrical conductivity of the resin composition due to accelerated ionic dissociation is small. With its quantity exceeding 50 parts by weight, the acrylic resin will lose its desired transparency, and its desired surface hardness will also be deprived. The mixing ratio of the alkali metal salt should desirably be in a range of from 0.1 part by weight to 30 parts by weight with respect to 100 parts by weight of the acrylic resin. When the alkali metal salt is less than 0.1 part by weight, improvement in the electrical conductivity of the resin composition is small and its antistatic effect is also small. On the contrary, when its mixing ratio exceeds 30 parts by weight, crystals tend to be readily deposited and the resin composition will lose its transparency and at the same time become brittle.

Furthermore, in the case wherein a the dipolar aprotic solvent is added, there is also desirable range in which it is added. That is to say, a desirable range for the mixing ratio of the dipolar aprotic solvent should preferably be 25% or less by weight with respect to the resin composition. When the dipolar aprotic solvent exceeds 25% by weight, the heat-deformation temperature of the resin composition becomes lowered and its value as the ordinary plastic material becomes lessened.

As the thermoplastic resin to be used for the present invention, there may be used various kinds of resins which have its heat-deformation temperature higher than the normal temperature, and can be molded in an ordinary way such as, for example, injection molding, extrusion molding, or compression molding. As examples of such thermoplastic resin, there may be enumerated acrylic resins, polycarbonate resin, acrylonitrile-butadiene-styrene resin, acrylonitrile-styrene resin, styrene resin, polyamide resin, polyester resins, and others. It is, of course, possible to use other thermoplastic resins, only if they have good compatibility with the alkali metal salt and the dipolar aprotic solvent.

According to the present invention, one or more known alkali metal salt may be used. Examples are: lithium, perchlorate, potassium perchlorate, sodium perchlorate, cesium perchlorate, lithium thiocyanate, potassium thiocyanate, sodium thiocyanate, cesium thiocyanate, lithium borofluoride, sodium borofluoride, lithium fluoride, lithium chloride, lithium bromide, lithium iodide, potassium iodide, sodium iodide, and so forth.

As the dipolar aprotic solvent, one or more such solvent which dissolves the alkali metal salt and has compatibility with the resin may be used. Examples of such dipolar aprotic solvent are: propylene carbonate, ethylene carbonate, dimethylformamide, diethylformamide, dimethylacetamide, N-methylpyrrolidone, tetramethyl urea, hexamethylphosphoramide, dimethyl sulfoxide, acetonitrile, sulforane, and others.

As the vinylidene fluoride resin intended for the present invention, there may be used those resins which have a heat-deformation temperature higher than normal temperature and are capable of being shaped in an ordinary way such as, for example, by injection molding, extrusion molding, and compression molding.

The resultant resin composition according to the invention which has excellent antistatic property may be processed by any ordinary shaping method such as, for example, by injection molding method, extrusion molding method, compression molding method, vacuum molding method, and the like.

With a view to enabling those persons skilled in the art to readily practice present invention the following preferred examples are given. It should, however, be noted that the present invention is not to be limited to these examples alone, but various changes and modifications in the ingredients and preparation conditions may be made within the scope of the present invention as defined by the appended claims.

EXAMPLE 1

A clear solution was obtained by dissolving 30 parts by weight of lithium perchlorate (anhydrous) into 70 parts by weight of propylene carbonate, while stirring the same at 80° C. As the thermoplastic resin, "ACRYPET S" (a tradename for acrylic resin produced by Mitsubishi Rayon Co. Ltd., Japan) was used. To 100 parts by weight of this resin, 11 parts by weight of the above-mentioned solution was added, and the whole batch was kneaded at 180° C. by use of an extruder, followed by the shaping the kneaded material into pellets by means of a pelletizing machine. The thus obtained pellets were then formed into test specimens in the form of a plate having a thickness of about 3 mm by use of an injection molding machine. Then, by use of a "Static Honest Meter", the half life of the static voltage was measured, from which the antistatic property of the resin was determined. The results are as shown in the following Table 1.

The conditions for the measurement of the resin composition in the form of a planar specimen by use of the Static Honest Meter were as follows:

| | |
|---|---|
| Applied voltage | 10,000 volts |
| Number of revolution of specimen | 1,300 rpm |
| Relative humidity at measurement | 50% RH |
| Temperature at measurement | 30° C. |
| Time for voltage application | 1.0 min. |

The anti-washing property was measured in the following manner: after sufficiently washing the surface of the specimens with an aqueous solution of neutral detergent, they were sufficiently rinsed with ion-exchanged water; thereafter, the specimens were dried in a desiccator at a room temperature for one week; and the thus treated specimens were subjected to measurement of the half life of the static voltage by use of the Static Honest Meter. The results are as shown in Table 1 below.

Transparency of the specimen resin was evaluated by its light transmission. The method of measurement was based on that as prescribed in ASTM D1003. The result of the measurement is shown also in Table 1 below.

EXAMPLE 2

Same as in Example 1 above, a solution composed of 95 parts by weight of propylene carbonate and 5 parts by weight of lithium perchlorate (anhydrous) was prepared. Also, as in Example 1 above, 11 parts by weight of this solution was admixed with 100 parts by weight of "ACRYPET VH" (a tradename for the acrylic resin, a product of Mitsubishi Rayon Co., Ltd. Japan), from which test specimens were produced. The antistatic property, the anti-washing property, and the transparency of these last specimens were evaluated in the same manner as in Example 1 above. The results are as shown in Table 1 below.

EXAMPLE 2

In the same manner as in Example 1 above, a solution composed of 60 parts by weight of propylene carbonate and 40 parts by weight of lithium perchlorate was prepared. 15 parts by weight of this solution was added to 100 parts by weight of "ACRYPET S", and the mixture was kneaded by means of a kneader, followed by shaping it into planar test specimens of 2 mm thick by compression molding. The test specimens were then evaluated in the same manner as in Example 1 above for their antistatic property, their anti-washing property and their transparency. The results are as shown in Table 1 below.

EXAMPLE 4

23 parts by weight of propylene carbonate solution of lithium perchlorate as obtained in Example 3 above and 100 parts by weight of "ACRYPET S" were kneaded in the same manner as in Example 3 above to prepare test specimens. The antistatic property, the anti-washing property and the transparency of the test specimens of the resin composition were evaluated, the results of which are as shown in Table 1 below.

COMPARATIVE EXAMPLE 1

Test specimens were prepared in the same manner as in Example 1 above with the exception that no propylene carbonate and lithium perchlorate (anhydrous) were added to "ACRYPET S" as the acrylic resin. With such test specimens, the antistatic property and the transparency of the resin composition were evaluated, the results of which are as shown in Table 1 below.

COMPARATIVE EXAMPLE 2

In the same manner as in Example 1 above, test specimens of a composition consisting of 100 parts by weight of "ACRYPET S" and 10 parts by weight of propylene carbonate were manufactured, followed by evaluation of their antistatic property and their transparency. The results are as shown in Table 1 below.

COMPARATIVE EXAMPLE 3

In the same manner as in Example 1 above, test specimens of a composition consisting of 100 parts by weight of "ACRYPET S" and 5 parts by weight of lithium perchlorate (anhydrous) were manufactured, followed by evaluation of their antistatic property and their transparency. The results are as shown in Table 1 below.

TABLE 1

|  | Half life of static voltage (sec.) | | Light transmission (%) |
| --- | --- | --- | --- |
|  | Non-treated | Rinsed with water | |
| Example 1 | 2.0 | 0.8 | 92 |
| Example 2 | 3.6 | 1.2 | 92 |
| Example 3 | 1.2 | 0.7 | 92 |
| Example 4 | 0.6 | 0.4 | 92 |
| Comparative Example 1 | >600 | >600 | 92 |
| Comparative Example 2 | >600 | >600 | 92 |
| Comparative Example 3 | 36 | 24 | 92 |

EXAMPLE 5

A clear solution was obtained by dissolving 40 parts by weight of lithium perchlorate (anhydrous) into 60 parts by weight of ethylene carbonate, while agitating the mixture at a temperature of about 80° C. 16 parts by weight of this solution was added to 100 parts by weight of "ACRYPET S" and the whole batch was kneaded by use of a kneader, from which test specimens having a thickness of 2 mm were obtained by the compression molding. Then, in the same manner as in Example 1 above, the antistatic property, the anti-washing property and the transparency of the resin compositions were evaluated, the results of which are as shown in Table 2 below.

EXAMPLE 6

In the same manner as in Example 5 above, test specimens of a composition consisting of 23 parts by weight of the solution as obtained in Example 5 above and 100 parts by weight of "ACRYPET S" were prepared, followed by evaluation of their antistatic property, their anti-washing property and the transparency. The results are as shown in Table 2 below.

TABLE 2

|  | Half life of static voltage (sec.) | | Light transmission (%) |
| --- | --- | --- | --- |
|  | Non-treated | Rinsed with water | |
| Example 5 | 1.4 | 0.8 | 92 |
| Example 2 | 0.8 | 0.6 | 92 |

As shown in Tables 1 and 2 above, the resin composition according to the foregoing Examples 1 to 6 of the present invention has its antistatic effect much improved even under a low humidity condition in comparison with Comparative Examples 1 to 3, and such antistatic effect did not decrease even after washing of the resin composition. In addition, the light transmission did not also decrease and the resin composition could maintain its favorable transparency.

As has been explained with reference to the foregoing preferred Examples 1 to 6, the present invention has its remarkable effect of providing an improved resin composition which, by inclusion into it of the alkali metal salt and the dipolar aprotic solvent, maintains favorable antistatic effect even in the atmosphere of low humidity, and moreover the antistatic effect is not lowered even after washing.

When an acrylic resin is used as the theremoplastic resin its transparency is maintained.

EXAMPLE 7

10 parts by weight of "KF POLYMER #1000" (a tradename for a product of Kureha Kagaku Kogyo K.K., Japan) as vinylidene fluoride resin and 4.5 parts by weight of lithium perchlorate (anhydrous) as the alkali metal salt were dry-blended with 100 parts by weight of "ACRYPET VH" (a tradename for a product of Mitsubishi Rayon Co. Ltd., Japan) as the acrylic resin. The mixture was kneaded by melting under 180° C. by use of an extruder, and the kneaded material was formed into pellets for use in injection molding. The pellets were then molded into planar test specimens having a thickness of about 3 mm by use of an injection molding machine. The test specimens were then evaluated for their antistatic property by the ash test (a test method for measuring a height, at which the test specimens rubbed with cloth start to attract fresh tobacco ash). The results are as shown in Table 3 below.

The conditions for the measurement by the ash test method are as follows:

| | |
|---|---|
| Cloth for rubbing | dry cotton cloth |
| Number of times for rubbing | 10 times |
| Temperature at measurement | 25° C. |
| Humidity at measurement | 45% RH |
| Time after rubbing until measurement of height | 2 sec. |

The transparency of the test specimen was evaluated in terms of its light transmission. The measurement method for it was based on that as prescribed in ASTM D1003. The test results are as shown in Table 3 below.

EXAMPLE 8

In the same manner as in Example 7 above, 10 parts by weight of "KF POLYMER #1000" and 2.2 parts by weight of lithium perchlorate (anhydrous) were dry-blended with 100 parts by weight of "ACRYPET VH", and the mixture was subjected to melting and kneading by use of an extruder to prepare test specimens. The antistatic property and the transparency of this test specimen were evaluated in the same manner as in Example 7 above, the results of which are as shown in Table 3 below.

EXAMPLE 9

In the same manner as in Example 7 above, 15 parts by weight of "KF POLYMER #1000" and 2.2 parts by weight of lithium perchlorate (anhydrous) were dry-blended with 100 parts by weight of "ACRYPET VH". Then, the mixture was subjected to melting and kneading by use of an extruder to thereby prepare test specimens. The antistatic property and the transparency of the resin composition were evaluated in the same manner as in Example 7 above, the results of which are as shown in Table 3 below.

COMPARATIVE EXAMPLE 4

By use of an injection molding machine, test specimens having a thickness of 3 mm were prepared from "ACRYPET VH" alone. The antistatic property and the transparency of this resin composition were evaluated in the same manner as in Example 7 above, the results of which are shown in Table 3 below.

COMPARATIVE EXAMPLE 5

In the same manner as in Example 7 above, 15 parts by weight of "KF POLYMER #1000" was dry-blended with 100 parts by weight of "ACRYPET VH". Then, this mixture was subjected to melting and kneading by use of an extruder to be formed into test specimens. The antistatic property and the transparency of the test specimens were evaluated in the same manner as in Example 7 above, the results of which are as shown in Table 3 below.

COMPARATIVE EXAMPLE 6

In the same manner as in Example 7 above, 2.2 parts by weight of lithium perchlorate (anhydrous) was dry-blended with 100 parts by weight of "ACRYPET VH". Then, this mixture was subjected to melting and kneading by use of an extruder to thereby prepare test specimens. The antistatic property and the transparency of this resin composition were evaluated in the same manner as in Example 7 above. The results are as shown in Table 3 below.

EXAMPLE 10

3.5 parts by weight of "KF POLYMER #1000" and 5.5 parts by weight of lithium perchlorate (anhydrous) were dry-blended with 100 parts by weight of "ACRYPET VH", to which 2.2 parts by weight of propylene carbonate as the dipolar aprotic solvent was further added. This mixture was then subjected to melting and kneading by use of an extruder, which was then formed into test specimens having thickness of 3 mm by use of an injection molding machine. The antistatic property and the transparency of this resin composition were evaluated in the same manner as in Example 7 above, the results of which are as shown in Table 4 below.

EXAMPLE 11

2.5 parts by weight of "KF POLYMER #1000" was dry-blended with 100 parts by weight of "ACRYPET VH" with further addition of 9 parts by weight of a solution prepared by dissolving 25 parts by weight of lithium perchlorate into 100 parts by weight of propylene carbonate. This mixture was then subjected to melting and kneading by use of an extruder which was formed into test specimens having a thickness of 3 mm by use of an injection molding machine. The antistatic property and the transparency of this resin composition were evaluated in the same manner as in Example 7 above, the results of which are as shown in Table 4 below.

COMPARATIVE EXAMPLE 7

55 parts by weight of "KF POLYMER #1000" and 5 parts by weight of lithium perchlorate were dry-blended with 100 parts by weight of "ACRYPET VH", and the mixture was subjected to melting and kneading by use of an extruder, which was then formed into test specimens having a thickness of 3 mm by use of an injection molding machine. The antistatic property and the transparency of this resin composition were evaluated in the same manner as in Example 7 above, the test results of which are as shown in Table 4 below.

TABLE 3

| | Charging property (height, at which attraction starts) (cm) | Light transmission (%) |
|---|---|---|
| Example 7 | 1 | 93 |
| Example 8 | 2 | 93 |
| Example 9 | 1.5 | 93 |
| Comparative Example 4 | 11 | 93 |
| Comparative Example 5 | 10.5 | 93 |
| Comparative Example 6 | 10.5 | 93 |

TABLE 4

| | Charging property (height, at which attraction starts) (cm) | Light transmission (%) |
|---|---|---|
| Example 10 | 0.5 | 93 |
| Example 11 | 0 | 93 |
| Comparative Example 7 | 3 | 54 |

As can be seen with reference to the foregoing Examples 7 to 11, the present invention has its remarkable effect of producing resin compositions which, by inclusion of vinylidene fluoride resin and alkali metal salt, maintain good transparency and exhibit favorable antistatic property. Further, by inclusion of the dipolar aprotic solvent into the resin composition, the antistatic effect is greatly improved.

What is claimed is:

1. A resin composition which consists essentially of a thermoplastic resin in which are included effective amounts to impart an antistatic effect to said resin composition in an amount of at least 0.1 parts by weight in 100 parts by weight of said thermoplastic resin of an alkali metal salt which ionically disassociates in said resin, and at least 1 part by weight in 100 parts of said thermoplastic resin of at least one kind of substance selected from the group of vinylidene fluoride resin and dipolar aprotic solvent which dissolves the alkali metal salt and is compatible with the resin.

2. A resin composition according to claim 1, wherein 0.1 to 30 parts by weight of said alkali metal salt and 1 to 30 parts by weight of said dipolar aprotic solvent are included in 100 parts by weight of said thermoplastic resin.

3. A resin composition according to claim 1 or 2, wherein said thermoplastic resin is acrylic resin.

4. A resin composition according to claim 3, wherein 1 to 50 parts by weight of said vinylidene fluoride resin and 0.1 to 30 parts by weight of said alkali metal salt are included in 100 parts by weight of said acrylic resin.

5. A resin composition according to claim 1, wherein a dipolar aprotic solvent is included at a ratio of 25% or less by weight with respect to said resin composition.

6. A resin composition which consists essentially of a thermoplastic resin selected from the group consisting of acrylic, polycarbonate, acrylonitrile-butadiene-styrene, acrylonitrile-stryene, stryene, polyamide and polyester resins, in which are included to impart an antistatic effect to said resin composition 0.1 to 30 parts by weight in 100 parts by weight of said thermoplastic resin of an alkali metal salt selected from the group consisting of lithium perchlorate, potassium perchlorate, sodium perchlorate, cesium perchlorate, lithium thiocyanate, potassium thiocyanate, sodium thiocyanate, cesium thiocyanate, lithium borofluoride, sodium borofluoride, lithium fluoride, lithium chloride, lithium bromide, lithium iodide, potassium iodide, and sodium iodide, and at least one kind of substance selected from the group consisting of vinylidene fluoride in an amount of 1 to 50 parts by weight in 100 parts by weight of said thermoplastic resin and dipolar aprotic solvent selected from the group consisting of propylene carbonate, ethylene carbonate, dimethylformamide, diethylformamide, dimethylacetamide, N-methylpyrrolidone, tetramethyl urea, hexamethylphosphoramide, dimethyl sulfoxide, acetonitrile and sulforan in a ratio of about 1 to 25% by weight with respect to the total resin composition.

* * * * *